United States Patent [19]

He

[11] Patent Number: 5,799,265
[45] Date of Patent: Aug. 25, 1998

[54] APPARATUS AND METHOD FOR GENERATING A SINUSOIDAL SIGNAL

[75] Inventor: Liang He, Sunnyvale, Calif.

[73] Assignee: Sun Microsystems, Inc., Mountain View, Calif.

[21] Appl. No.: 756,030

[22] Filed: Nov. 26, 1996

[51] Int. Cl.$^6$ .................................................. G06F 1/02
[52] U.S. Cl. .................. 702/66; 364/718.03; 364/721
[58] Field of Search ............................ 364/487, 480, 364/481, 131, 133, 136, 718, 721, 851, 852, 607, 608, 718.01, 718.03; 327/100, 105, 129, 184; 345/24, 53, 94, 443; 702/66

[56] References Cited

U.S. PATENT DOCUMENTS

| | | | |
|---|---|---|---|
| 5,179,348 | 1/1993 | Thompson | 327/105 |
| 5,280,571 | 1/1994 | Keith et al. | 345/443 |
| 5,524,087 | 6/1996 | Dawamura et al. | 364/721 |
| 5,598,545 | 1/1997 | Childers et al. | 395/562 |

*Primary Examiner*—Melanie Kemper
*Attorney, Agent, or Firm*—Flehr Hohbach Test Albritton & Herbert LLP; William S. Galliani

[57] ABSTRACT

The present invention pertains to a method and system for generating a sinusoidal signal as a combination of independently generated sinusoidal signals. A sinusoidal signal consisting of M data points per cycle is generated as a combination of P independently generated sinusoidal signals each consisting of M/P data points per cycle. Each independently generated sinusoidal signal is offset by P−1 data points and interleaved according to a prescribed sequence to represent the combined sinusoidal signal. The system of the present invention utilizes a processing unit having the capability of performing a single instruction on multiple data (SIMD) thereby executing multiple operations per cycle. This architecture enables each data point of the P independently generated sinusoidal signals to be generated simultaneously thereby decreasing the computational expense required to generate the sinusoidal signal.

10 Claims, 7 Drawing Sheets

APPARATUS AND METHOD FOR GENERATING A SINUSOIDAL SIGNAL

The present invention relates generally to digital signal processing. More particularly, the invention relates to the generation of a sinusoidal signal utilizing parallel instructions.

BACKGROUND OF THE INVENTION

A sinusoidal signal is one of the fundamental signals used in digital signal processing. As such, it can be generated by utilizing several known techniques. In one technique, a look-up table is used to store a set of data points representing a portion of a sine wave. For example, the look-up table can store the data points associated with one quarter of a sine wave cycle. These data points are then interpolated in order to generate a complete sine waveform at a specified sampling rate and frequency. However, limitations of this technique include the use of interpolated data which generates a coarse approximation of a sine waveform, the storage of large amounts of memory to store the lookup table, and accesses to memory to read the data from the lookup table.

Infinite impulse response (IIR) filters are also used to generate a sinusoidal signal. One type of IIR filter generates each data point, $y_N$, of a sinusoidal signal in accordance with the following mathematical relation: $y_N = A*y_{N-1} - y_{N-2}$, where $A = 2* \cos (2*\pi*W/T)$, W is the frequency of a sinusoidal signal, and T is the sampling rate. The IIR filter utilizes an iterative calculation where each data point is based on the previous two data points. The IIR filter generates a more accurate signal but incurs the overhead of increased computational expense. This computational expense is due in part to the iterative nature of the calculation which requires each data point to be determined sequentially and also due to the use of the cosine factor. The iterative nature of the calculation prevents the use of parallel processing.

The computational expense associated with the IIR filter can be overcome by utilizing a high performance microprocessor. Currently, several microprocessors exist that are able to execute certain instructions simultaneously on multiple sets of data thereby achieving faster performance levels. However, an impediment to achieving this increased productivity is the constraint of executing instructions sequentially. Accordingly, there exists a need to utilize parallel computations in the generation of a sinusoidal signal.

SUMMARY OF THE INVENTION

The present invention pertains to a method and apparatus for generating a sinusoidal signal as a combination of independently generated sinusoidal signals. A sinusoidal signal consisting of M data points per cycle is generated as a combination of P independently generated sinusoidal signals each consisting of M/P data points per cycle. Each generated data point is then interleaved into a sequence representing the combined sinusoidal signal.

The system utilizes a processing unit having a superscalar architecture that is equipped with performing a single instruction on multiple data (SIMD). In the preferred embodiment, the UltraSPARC superscalar microprocessor architecture is used which supports the execution of four instructions per cycle. Its SIMD capability allows certain instructions to operate on four datums concurrently thereby executing ten instructions per cycle.

In a preferred embodiment, a sinusoidal signal is generated as a combination of two sinusoidal signals that each generate M/2 data points per cycle. A first signal generates alternating or even-numbered data points and the second signal generates the complementary or odd-numbered data points. Each data point of each signal is generated simultaneously in pairs, where one data point is an even-numbered data point and another data point of the pair is the next sequential odd-numbered data point. Each data point is then interleaved into the appropriate sequential order thereby producing the intended sinusoidal signal.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Overview

The increased processor performance of parallel architectures is exploited when programs are structured to execute instructions concurrently. This increased processor performance is crucial for computationally intensive scientific and engineering functions. One such function is a sinusoidal signal.

In a preferred embodiment of the present invention, a sinusoidal signal is generated as a combination of the following two two separate streams of data points:

$y_{n1} = y_1, y_3, y_5, \ldots, y_{2*n-1}$ $y_{n2} = y_0, y_2, y_4, \ldots, y_{2*n}$ The data points are then interleaved to represent the sequence $y = y_0, y_1, y_2, \ldots, y_N$. In generating a sinusoidal signal in this manner, the parallelism of a SIMD architecture is exploited since each data point of each independent sinusoidal signal is generated simultaneously.

System Architecture

Figure 1:
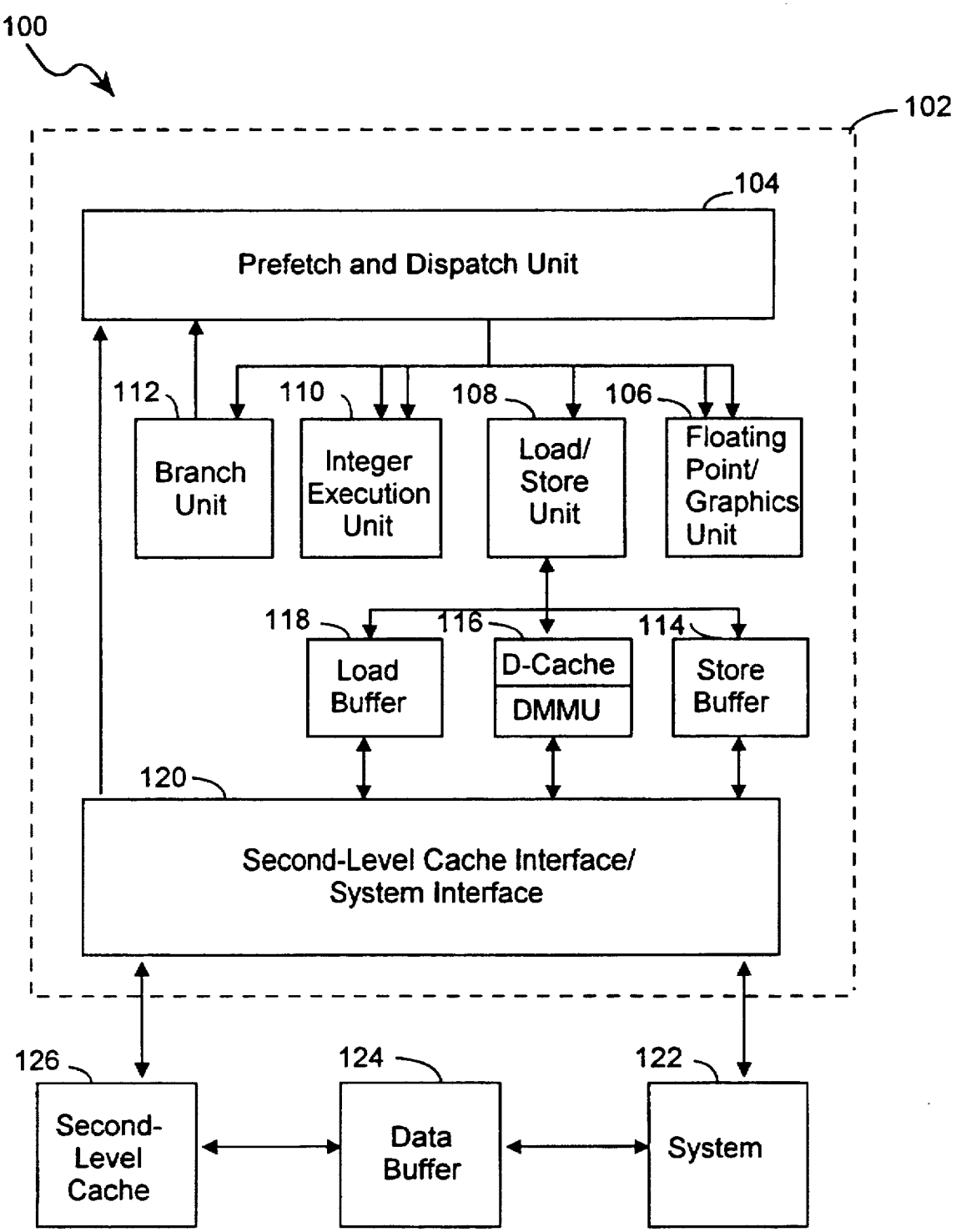
FIG. 1 is a block diagram of a computer system incorporating an embodiment of the present invention.

FIG. 1 is illustrates a computer system 100 for use with the present invention. The computer system 100 utilizes a computer architecture having the capability to process instructions in parallel. The computer system 100 includes a processing unit, preferably a microprocessor 102, in communication with an external memory, preferably a second-level cache 126, and additional components denoted as a system 122. The system 122 can consist of additional memory units, I/O devices, processing units, and the like. A data buffer 124 located between the system 122 and the second-level cache 126 can be used to temporarily store data that is transmitted between the second-level cache 126 and the system 122.

In an embodiment of the present invention, computer system 100 utilizes the UltraSPARC microprocessor 102 implementing the 64-bit SPARC-V9 RISC architecture. The UltraSPARC microprocessor 102 is a superscalar processor which supports the execution of four instructions per cycle. Its SIMD capability allows certain instructions to operate on four datums concurrently thereby executing ten instructions per cycle.

The microprocessor 102 can include a prefetch and dispatch unit 104, a floating point/graphics unit 106, a load/ store unit 108, an integer execution unit 110, a branch unit 112, a load buffer 118, a memory 116, a store buffer 114, and an interface to the second-level cache 126 and system 122. The prefetch and dispatch unit 104 prefetches instructions based upon a dynamic branch prediction mechanism and a next field address. The floating point and graphics unit 106 provides five functional units that support various floating point arithmetic operations and graphic arithmetic operations. The load/store unit 108 executes all instructions that transfer data between the memory 116, the integer execution unit 110, and the floating point/graphics unit 106. The integer execution unit 110 performs integer computations for all integer arithmetic/logical operations. The memory 116 includes a data cache (D-Cache) and a data memory management unit (DMMU). The store buffer 114 provides a temporary holding place for store operations until they can be stored in either the data cache 116 or the second-level cache 126. The second-level cache interface/system interface 120 performs the necessary processing for the microprocessor 102 to interface with the system 122 and the second-level cache 126.

Figure 2:
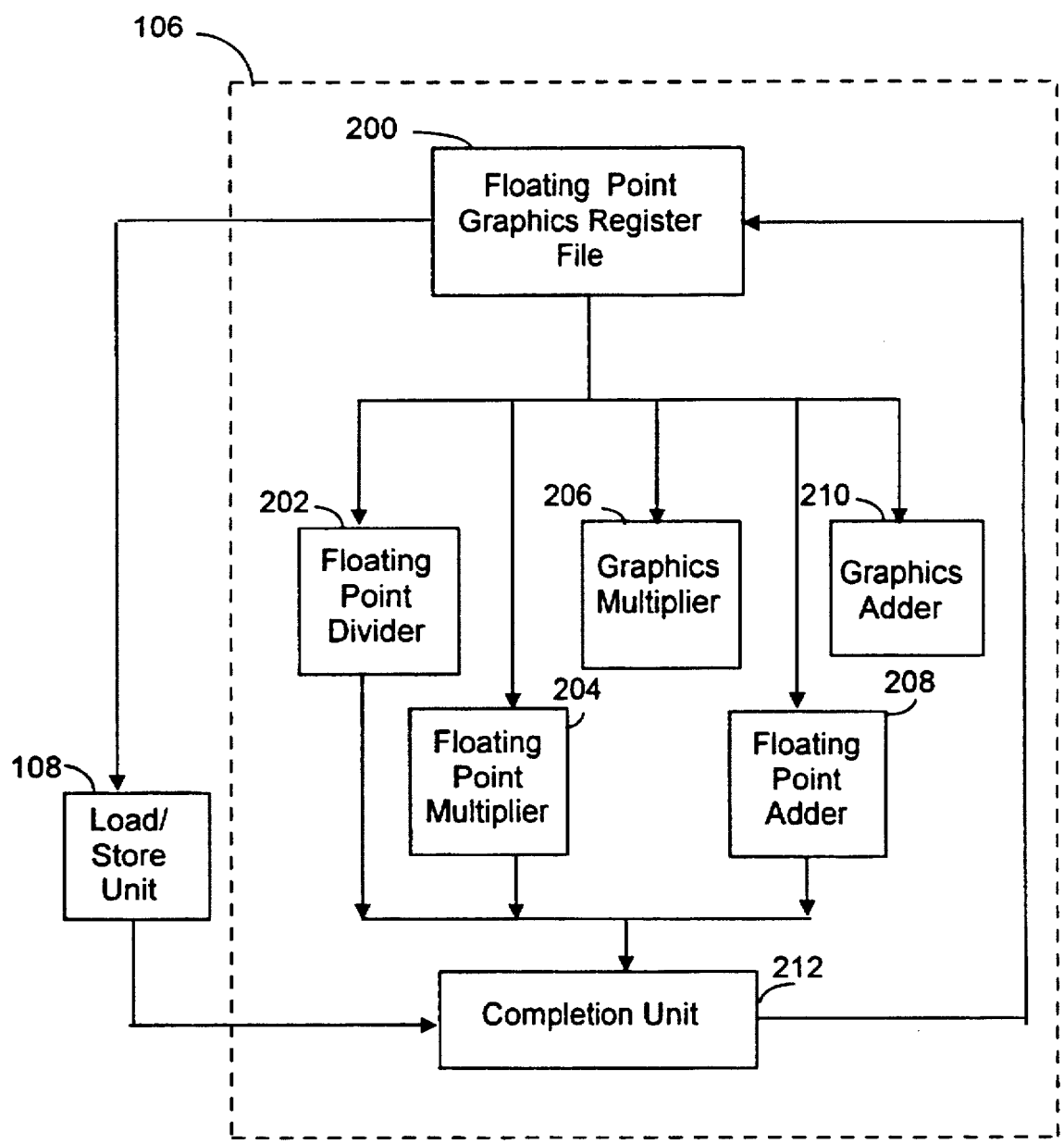
FIG. 2 is a block diagram of the Floating-Point and Graphics Unit illustrated in FIG. 1.

FIG. 2 illustrates the floating point/graphics unit 106. The floating point/graphics unit 106 performs partitioned integer arithmetic operations thereby enabling a single arithmetic instruction to be performed simultaneously on multiple datums in a single cycle. This type of processing is otherwise known as single-instruction-multiple-data (SIMD) parallel processing.

The floating point/graphics unit 106 includes a register file 200 of 32 64-bit registers, a floating point divider 202, a floating point multiplier 204, a floating point adder 208, a graphics adder 210, and a graphics multiplier 206. The graphics adder 210 is organized as 4 independent 16-bit adders. The graphics multiplier 206 is composed of four 8×16 (i.e., 8-bit by 16-bit) multipliers. A graphics status register (GSR) 200 with scale factor and align offset fields is used to support format conversion and memory alignment.

The floating point/graphics unit 106 is used to support partitioned integer arithmetic instructions. A partitioned integer arithmetic instruction enables a single arithmetic instruction to be performed on multiple data components stored in a variable. For example, by partitioning a 64-bit variable into four 16-bit components and a 32-bit value into four 8-bit components, four 8×16 multiplication operations can be performed simultaneously in a single cycle. In the preferred embodiment, the floating point/graphics unit 106 supports the following partitioned integer arithmetic instructions: an addition or subtraction instruction on either 16 or 32-bit components of a 64-bit variable; and seven multiplication instructions that are capable of various 8-bit and 16-bit component multiplications.

Figure 3:
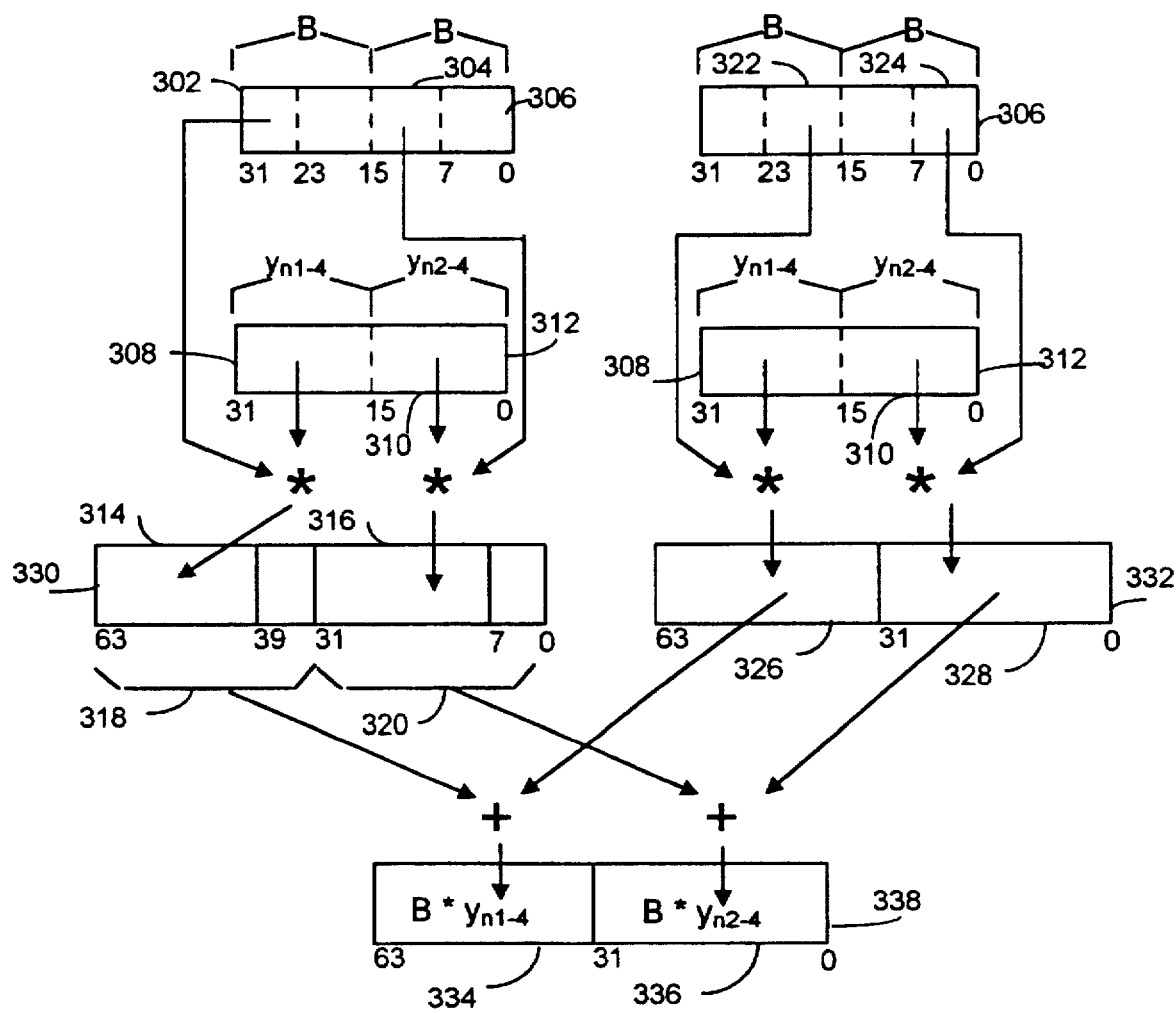
FIGS. 3, 4, and 6 depict an example of the present invention utilizing a parallel instruction set to simultaneously generate two data streams of data points in accordance with an embodiment the present invention.
Figure 4:
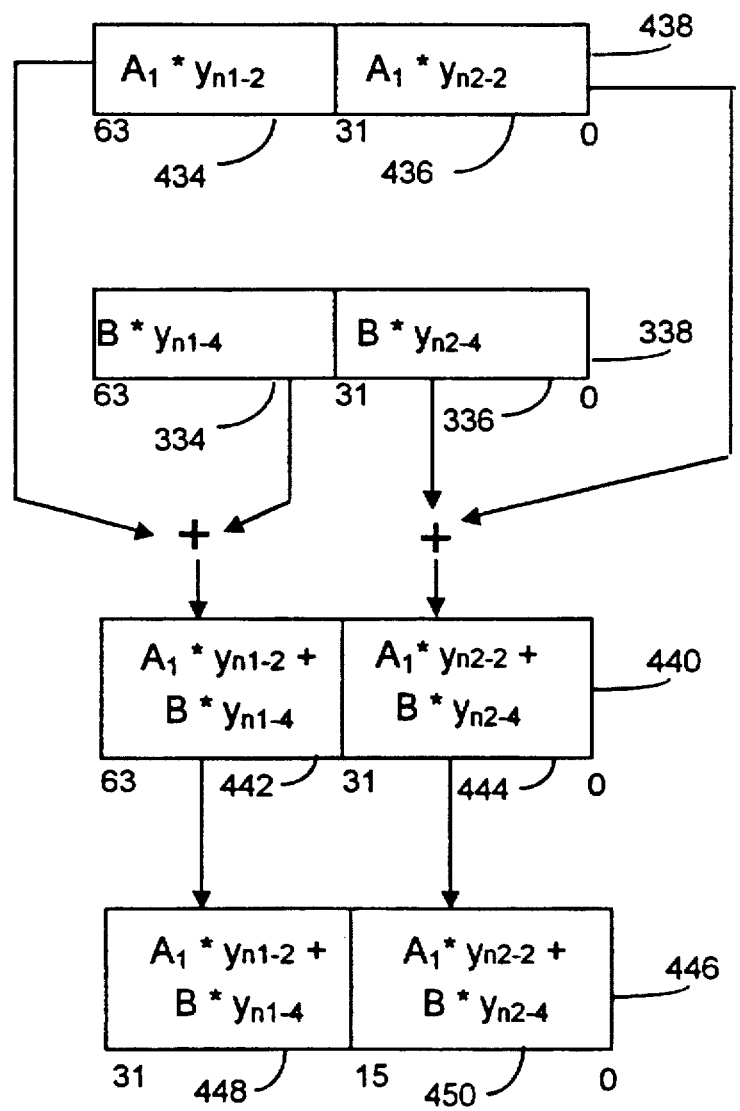

FIGS. 3 and 4 illustrate the operation of the fmul8sux16, fmul8ulx16, fpadd32, and fpackfix instructions. The fmul8sux16 and fmul8ulx16 instructions perform two 8×16 multiplications concurrently. The fpadd32 instruction performs two 32-bit additions concurrently by adding each 32-bit component of a first 64-bit operand simultaneously with each 32-bit component of a second 64-bit operand. The fpackfix instruction performs two conversions simultaneously by converting each 32-bit component of a single 64-bit variable into two 16-bit components.

FIG. 3 illustrates the operation of the fmuld8sux16 instruction. A 32-bit variable 306 is partitioned into two 16-bit components. Each of the 16-bit components stores the value of B. A second 32-bit variable 312 is also partitioned into two 16-bit components 308, 310. The upper 16-bit component 308 stores the value of $y_{n1-4}$, and the lower 16-bit component 310 stores the value of $y_{n2-4}$. The fmuld8sux16 instruction performs two simultaneous 8×16 multiplication operations. The first multiplication operation multiplies the upper 8 bits 302 of the upper 16-bit component of variable 306 with the upper 16-bit component of variable 312 generating a 24-bit product 314. The second multiplication operation multiplies the upper 8 bits 304 of the lower 16-bit component of variable 306 with the lower 16-bit component of variable 312 generating a 24-bit product 316. Each 24-bit product 314, 316 is shifted left by 8 bits to produce a 32-bit result 318, 320 which is stored in a 64-bit variable 330.

FIG. 3 also illustrates the operation of the fmuld8ulx16 instruction. The fmuld8ulx16 instruction is a complementary instruction to the fmuld8sux16 instruction since it performs two 8×16 multiplication operations on the lower 8 bits of each 16-bit component of the first operand 306. The fmuld8ulx16 instructions performs a first 8×16 multiplication operation by multiplying the unsigned lower 8 bits 322, 324 of each 16-bit component of a first 32-bit partitioned operand 306 by each corresponding signed 16-bit component 308, 310 of a second 32-bit operand 312. Each multiplication produces a 24-bit product that is stored in a corresponding 32-bit component 326, 328 of a 64-bit result 332.

FIG. 3 also illustrates the operation of a fpadd32 instruction. The first operand is a 64-bit variable 330 that is partitioned into two 32-bit components 318, 320. The second operand is also a 64-bit variable 332 that is partitioned into two 32-bit components 326, 328. The upper 32-bit component 318 of the first operand 330 is added to the upper 32-bit component 326 of the second operand 332 and stored in the upper 32-bit component 334 of the 64-bit result 338. Concurrently, the lower 32-bit component 320 of the first operand 330 is added to the lower 32-bit component 328 of the second operand 332 and stored in the lower 32-bit component 336 of the 64-bit result 338.

FIG. 4 illustrates the operation of the fpackfix instruction. A fpackfix instruction takes two 32-bit fixed components within a 64-bit variable, scales and then truncates each component into two 16-bit signed components. This is accomplished by shifting each 32-bit component of the 64-bit variable according to a scale factor loaded in the GSR 200 and then truncating to a 16-bit scaled value starting between bits 16 and 15 of each 32-bit variable. Truncation converts the scaled value to a signed integer (i.e., rounds toward negative infinity).

For example, referring to FIG. 4, variable 440 is 64-bit wide and partitioned into two 32-bit components 442, 444. The fpackfix instruction simultaneously scales and truncates each 32-bit component 442, 444 into a respective 16-bit component 448, 450 of a 32-bit result 446.

In the preferred embodiment of the present invention, computer system 100 utilizes the UltraSPARC™ microprocessor manufactured by Sun Microsystems, Inc., the assignee of the present invention. A more detailed description of the UltraSPARC architecture can be found in Greenley, D., et. al., "UltraSPARC™: The Next Generation Superscalar 64-bit SPARC," 40th annual COMPCON, 1995, which is hereby incorporated by reference as background information. However, the present invention is not limited to this particular microprocessor or computer system architecture. It may be practiced without the specific details and may be implemented in various computer systems and in various configurations, or makes or models of processors that support the capability of parallel processing.

Sine Wave Generation

The present invention provides a system and method that generates a sinusoidal signal as a combination of P sinusoidal signals. Each of the P sinusoidal signals has M/P data points per cycle, where M is the number of data points for the combined sinusoidal signal. Each of the P sinusoidal signals is generated independently and staggered from the other sinusoidal signals by at most N data points. The generated data points are then interleaved into a sequence representing the combined sinusoidal signal.

For example, for the case where P=2, the intended sinusoidal signal is generated as a combination of two signals that each generate M/2 data points per cycle. A first signal generates alternating or even-numbered data points and the second signal generates the complementary or odd-numbered data points. Each data point of each signal is generated simultaneously in pairs, where the first data point is an even-numbered data point and the second data point of the pair is the next sequential odd-numbered data point. For instance, the values for $y_4$ and $y_5$ are generated simultaneously at one cycle, then the values for $y_6$ and $y_7$ at the next cycle, and so on. Both of these data points are interleaved in their respective sequential order (i.e., $y_4$ positioned before $y_5$) in order to produce the intended sinusoidal signal.

A sine wave can be generated by a digital sinusoidal oscillator in accordance with the following mathematical relation:

$$y_N = A*y_{N-1} - y_{N-2} + C*x, \quad (1)$$

where

A=2*cos (2*π*W/T), x=amplitude,

C=sin (W*T),

C*x=impulse excitation factor,

W=frequency of a specified sine waveform, and

T=sampling rate of the specified sine waveform.

A shortcoming of this computation is its reliance on the immediately previous two data points. This unnecessarily constrains the computation to execute in a serial manner rather than process in a parallel manner.

In order to achieve 2-way parallelism, the computation can be partitioned into two independent sinusoidal signals whose respective data points are generated simultaneously. This can be represented by the following mathematical relations:

$$y_{n1} = A_1 * y_{n1-2} - y_{n1-4}, \text{ where } n_1 \text{ is an even integer} \quad (2)$$

$$y_{n2} = A_1 * y_{n2-2} - y_{n2-4}, \text{ where } n_2 \text{ is an odd integer} \quad (3)$$

where $y_0 = 0$, (4)

$y_1 = \text{amplitude}*C$, (5)

$y_2 = y_1 * A_0$, (6)

$y_3 = y_2 * A_0 - y_1$, (7)

amplitude=user-defined value, (8)

C=sin (W*T), (9)

W=frequency of a specified sine wave that is user-defined, (10)

T=sampling rate of a specified sine wave that is user-defined, (11)

$A_0 = 2*\cos(\pi*W/T)$, (12)

$A_1 = 2*\cos(2*\pi*W/T)$ (13)

Accordingly the data points for the intended sinusoidal signal y are generated simultaneously as two separate streams of data points as follows:

$$y_{n1} = y_1, y_3, y_5, \ldots, y_{2*n-1}$$

$$y_{n2} = y_0, y_2, y_4, \ldots, y_{2*n}$$

The data points are then interleaved to represent the sequence $y = y_0, y_1, y_2, \ldots y_N$.

In the preferred embodiment, a rounding and scaling factor is included in equations (2)–(13). The rounding factor is preferably 0.5 and is used to round a value having a fractional part greater than 0.5 to the next integer value. The scaling factor is preferably 16384 and is used to scale the coefficients to 14-bits since the data points are constrained to 16-bit signed integers. Two bits are used for computation overflow. Incorporating the rounding and factors into equations (2)–(13) results in the following preferred mathematical relations:

$$y_{n1} = A_1 * y_{n1-2} + B * y_{n1-4}, \text{ where } n_1 \text{ is an even integer} \quad (14)$$

$$y_{n2} = A_1 * y_{n2-2} + B * y_{n2-4}, \text{ where } n_2 \text{ is an odd integer} \quad (15)$$

where $y_0 = 0$, (16)

$y_1 = \text{amplitude}*C$, (17)

$y_2 = y_1 * A_0$, (18)

$y_3 = y_2 * A_0 + y_1 * B$, (19)

amplitude=user-defined value, (20)

C=sin (W*T)*scaling factor, (21)

W=frequency of a specified sine wave that is user-defined, (22)

T=sampling rate of a specified sine wave that is user-defined, (23)

$A_0 = 2*\cos(\pi*W/T)+\text{scaling factor}+\text{rounding factor}$, (24)

$A_1 = 2*\cos(2*\pi*W/T)+\text{scaling factor}+\text{rounding factor}$, (25)

$B = -1.0*\text{scaling factor}+\text{rounding factor}$, (26)

rounding factor=0.5, (27)

scaling factor=16384 (28)

Although the present invention is described with reference to the aforementioned architecture and for the case that illustrates 2-way parallelism (i.e., P=2), the present invention is not limited to this particular case. The method can be generalized as follows for any value of P, where P represents the number of combined sinusoidal signals:

$$y_N = y_{N-P} * A_1 - y_{N-2P}, \text{ where there are } 2*P \text{ initial data points.}$$

Each of the independently generated sinusoidal signals is then offset by P−1 data points and is interleaved into a sequence representing the combined sinusoidal signal.

In the preferred embodiment of the present invention, a sinusoidal signal can be generated for a prescribed length. At a later point in time, the sinusoidal signal can be resumed from the last data point that was previously generated. In this situation, the last four data points of the previously generated sinusoidal signal are passed to the sinusoidal generator so that it can resume the signal from the point where it left off.

For the case where the sinusoidal signal is to commence starting at the origin, four initial data points are generated in order to initiate the two independent parallel data streams. This is due to the computation's dependence on the immediately previous two data points, $y_{N-2}$ and $y_{N-4}$. The generation of the odd-numbered data points initially requires the computation of $y_1$ and $y_3$ and the generation of the even-number data points initially requires the computation of $y_0$ and $y_2$. Thereafter, the even-numbered data points are generated in accordance with equation (14) and the odd-numbered data points are generated in accordance with equation (15).

Figure 5A:
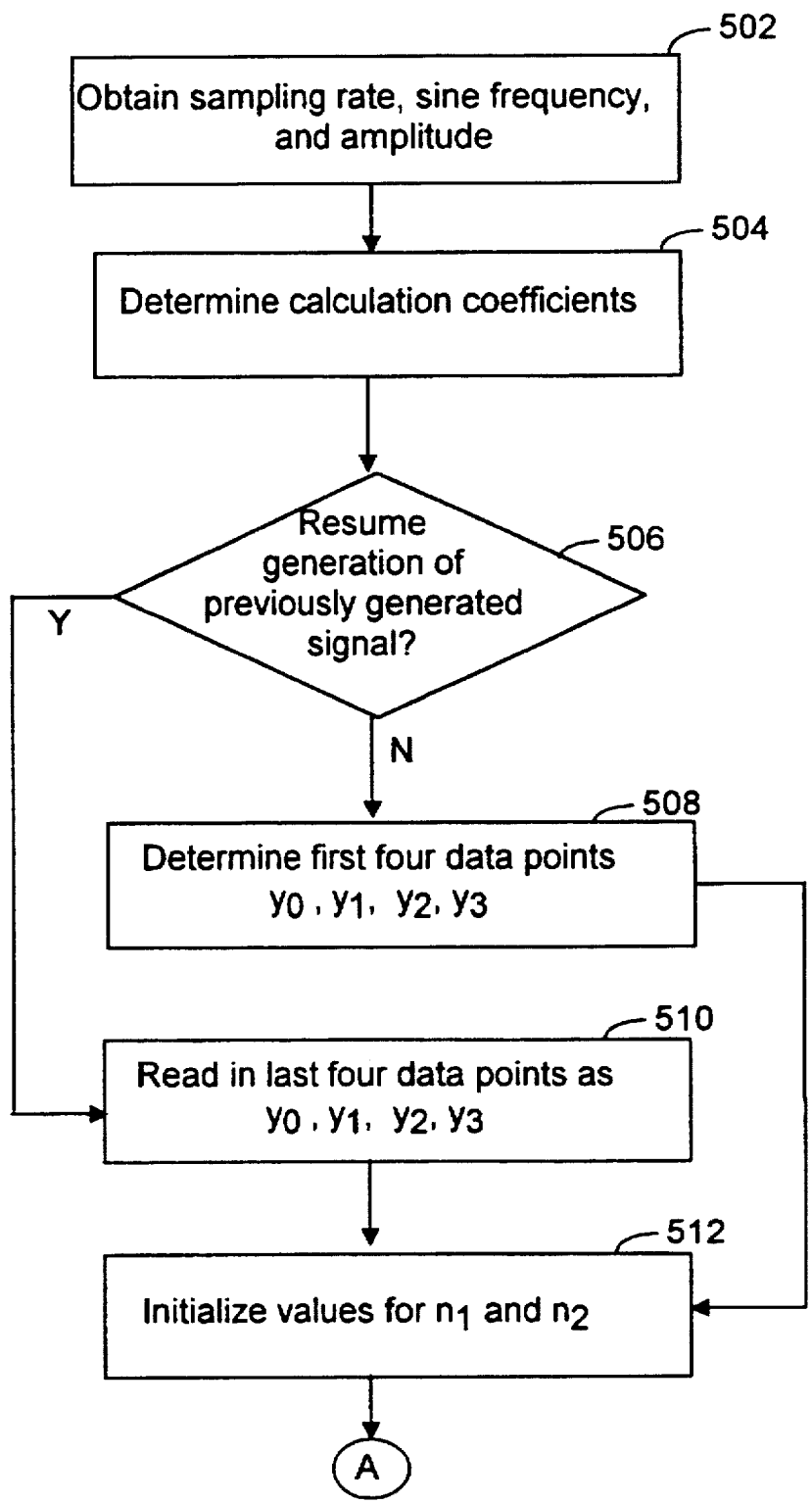
FIGS. 5A–5B are flow charts for simultaneously generating two data streams of data points in accordance with an embodiment of the present invention.
Figure 5B:
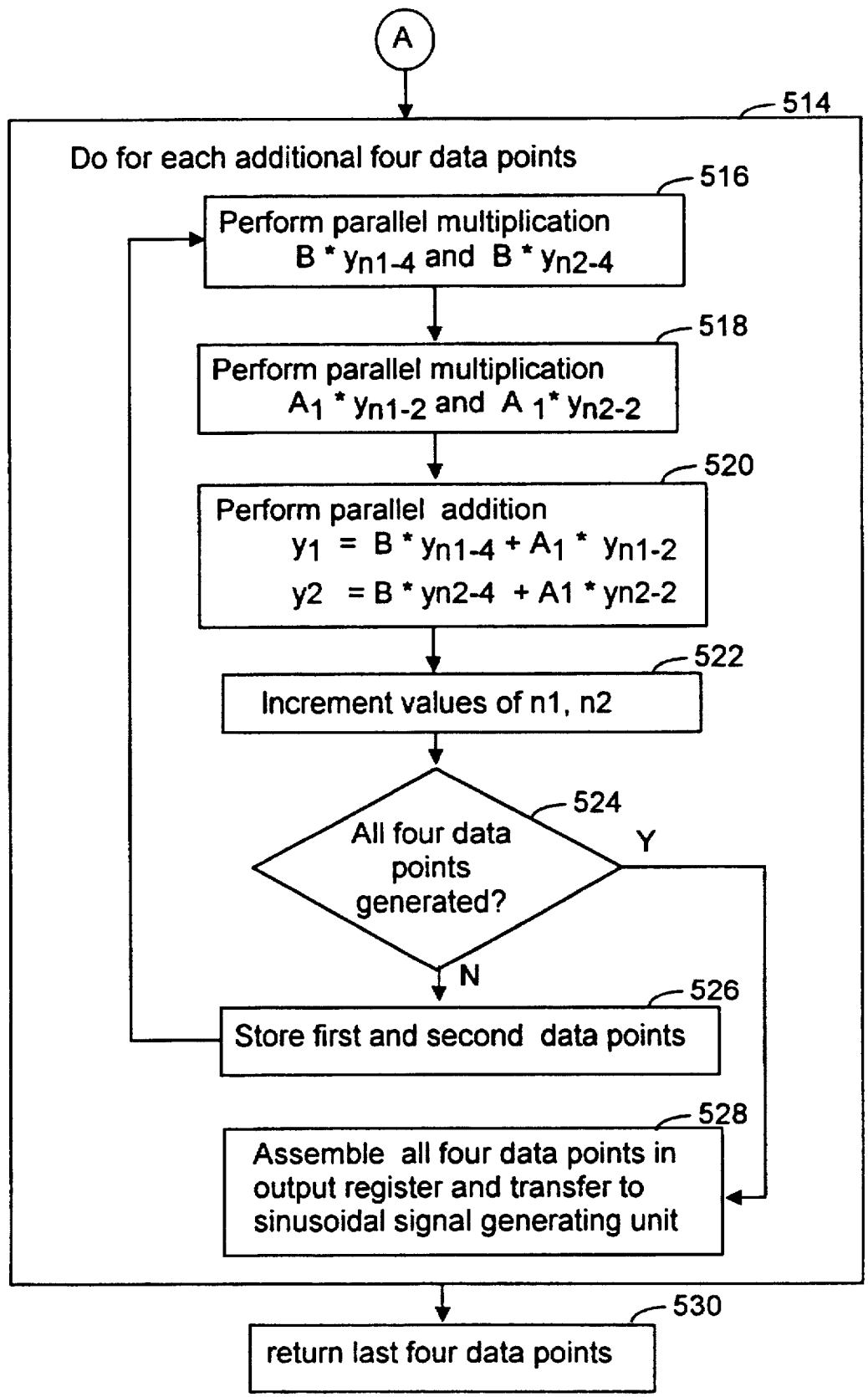
Figure 6:
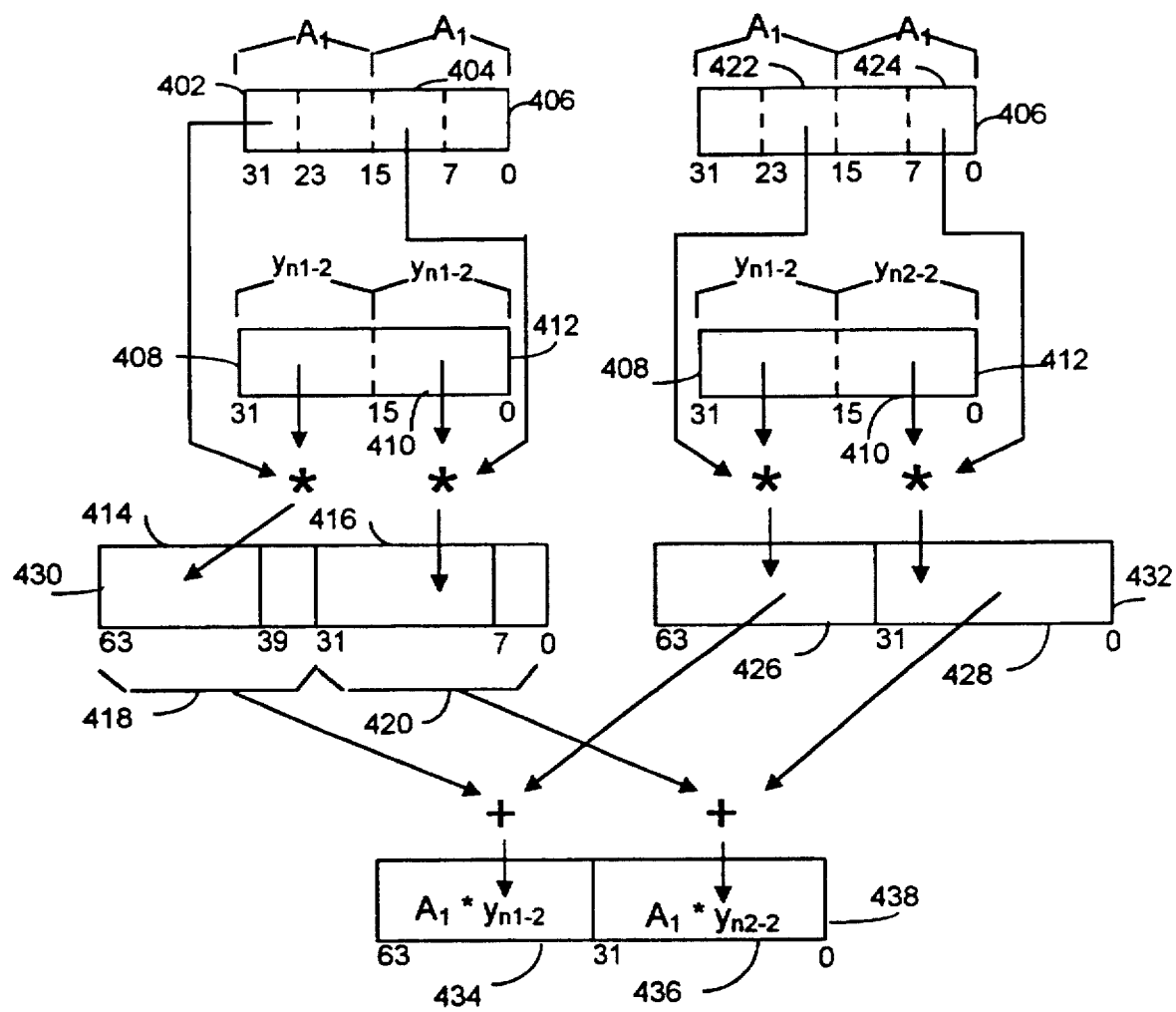

FIGS. 5A–5B illustrate the steps used in generating a sinusoidal signal that utilizes 2-way parallelism as described above. FIGS. 3, 4, and 6 depict an example utilizing the steps illustrated in FIGS. 5A–5B to simultaneously generate two data streams of data points in accordance with the present invention.

Referring to FIG. 5A, a user specifies the characteristics of the sinusoidal signal by specifying a sampling rate, a sinusoidal frequency, and the amplitude of the intended sinusoidal signal (step 502). The coefficients $A_0$, $A_1$, B, and C are calculated as described above in equations 21–28 (step 504). Next, a check is made to determine if the sinusoidal signal is being resumed from a previous calculation (step 506). If so (step 506-Y), the last four data points from the previous calculation are set as the initial four data points $y_0$, $y_1$, $y_2$, and $y_3$ (step 510). Otherwise (step 506-N), the first initial four data points, $y_0$, $y_1$, $y_2$, and $y_3$ are determined as described above in equations 16–19 (step 508). The values of n1 and n2 are then initialized (step 512). For this particular case, n1 is initialized to 4, and n2 is initialized to 5.

The method proceeds to generate the next four data points (step 514). This is done in order to gain the maximum throughput that the hardware can support. In this particular hardware implementation, the registers are 64-bit wide and the data points are 16-bit signed values. Thus, four 16-bit values are generated in order to fill a 64-bit register. However it should be noted that the present invention is not constrained to this particular hardware limitation.

Referring to FIGS. 3 and 5A, the next step of the method is to simultaneously perform the calculations $B*y_{n2-4}$ and $B*y_{n1-4}$ (step 516). This can be performed by storing the value of B into both 16-bit components of a first 32-bit partitioned operand 306. A second 32-bit operand 312 stores the values of $y_{n1-4}$ and $y_{n2-4}$. In the upper half of the variable 312, the value of $yn_{n1-2}$ can be stored and the value of $y_{n2-2}$ can be stored in the lower half A fmuld8sux16 instruction simultaneously multiplies the upper 8-bits of each 16-bit component with a corresponding 16-bit component of the second operand 312. The result is stored in a respective component in variable 330.

Next, a fmuld8ulx16 instruction is used to simultaneously multiply the lower 8-bits of each 16-bit component representing the value B with a corresponding 16-bit component of the second operand 312. The result is stored in a respective component in variable 332.

A fpadd32 instruction is then used to simultaneously add the respective components of both partial products. The product $B*y_{n1-2}$ is stored in the upper 32-bit component 334 of the product variable 338 and the product $B*y_{n2-2}$ is stored in the lower 32-bit component 336 of the same product variable 338.

The method continues by performing the parallel multiplication $A_0*y_{n1-1}$ and $A_0*y_{n2-1}$ (step 518). The steps are illustrated in FIG. 6 and are similar to those described above with respect to FIG. 3.

Referring to FIGS. 4 and 5B, the fpadd32 instruction can be utilized to perform the following additions simultaneously (step 520):

$y_{n1}=B*y_{n1-4}+A_1*y_{n1-2}$ and $y_{n2}=B*y_{n2-4}+A_1*y_{n2-2}$

Next, the values of n1 and n2 are incremented accordingly (step 522). A check is then made to determine if four data points have been generated (step 524). If the first two data points have been generated (step 524-N), then these data points are stored temporarily (step 526) until two additional data points are generated. Otherwise (step 524-Y), the four data points are assembled into a 64-bit output register and transmitted to the appropriate sinusoidal signal generating unit (step 528). The process then continues until a desired number of data points have been generated. At the completion of the method, the last four data points are returned to the calling procedure (step 530).

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

Furthermore, the method and system described hereinabove can be applied to other sinusoidal signals other than a sine wave. Additionally, one skilled in the art can easily alter the present invention to apply to other iteratively computed functions.

What is claimed is:

1. An apparatus to generate a sinusoidal signal, comprising:

a processor configured to execute a single mathematical operation on multiple variables in a single processor cycle; and a memory connected to said processor to store a first set of instructions, including instructions to execute a mathematical operation on multiple variables in a single processor cycle, to generate a group of offset sinusoidal signal segments, and a second set of instructions to direct said processor to interleave said group of offset sinusoidal signal segments into a single sinusoidal signal component;

wherein said single sinusoidal signal component includes M data points per signal cycle; and wherein said group includes P offset sinusoidal signal segments, each said offset sinusoidal signal segment including M/P data points per signal cycle offset by P−1 data points.

2. The apparatus of claim 1,
wherein said first set of instructions includes a multiply instruction.

3. The apparatus of claim 2,
wherein said first set of instructions further includes an addition instruction.

4. The apparatus of claim 1,
wherein said single sinusoidal signal component is generated at a first frequency; and
wherein said group includes P offset sinusoidal signal segments, each said offset sinusoidal signal segment generated at a second frequency, said second frequency being P times said first frequency.

5. The apparatus of claim 1,
wherein each of said M data points is generated in accordance with the following mathematical relation:

$$y_N = y_{N-P} * A_1 y_{N-2P},$$

where
N>2P−1,
$A_1 = 2 \cos(2*\pi*W/T)$,
$y_0, y_1, \ldots, y_{2P-1}$ represent initial data points,
W=frequency of said single sinusoidal signal component.
T=sampling rate of said single sinusoidal signal component.

6. A method executed by a computer under the control of a program, said computer including a memory for storing said program, said method comprising the steps of:

(a) simultaneously generating a group of offset sinusoidal signal segments from instructions that execute a mathematical operation on multiple variables in a single cycle; and (b) combining said set of sinusoidal signal segments to generate a single sinusoidal signal at a specified sampling rate and frequency;
wherein said single sinusoidal signal includes M data points per signal cycle; and
wherein said group includes P offset sinusoidal signal segments, each said offset sinusoidal signal segment including M/P data points per signal cycle offset by P−1 data points.

7. The method of claim 6,
wherein said instructions include a multiply instruction.

8. The method of claim 7,
wherein said instructions further includes an addition instruction.

9. The method of claim 6,
wherein said group includes P offset sinusoidal signal segments, each said offset sinusoidal signal segment generated at a second frequency, said second frequency being P times said specified frequency.

10. The method of claim 6,
said step (a) further comprising the step of simultaneously generating each said data point of each said offset sinusoidal signal segment generated in accordance with the following mathematical relation:

$$y_N = y_{N-P} * A_1 - y_{N-2P},$$

where
N>2P−1,
$A_1 = 2 \cos(2*\pi*W/T)$,
$y_0, y_1, \ldots, y_{2P-1}$ represent initial data points,
W=said specified frequency,
T=said specified sampling rate.

* * * * *